United States Patent
Arimilli et al.

(10) Patent No.: US 6,397,320 B1
(45) Date of Patent: May 28, 2002

(54) METHOD FOR JUST-IN-TIME DELIVERY OF LOAD DATA VIA CYCLE OF DEPENDENCY

(75) Inventors: Ravi Kumar Arimilli; Lakshminarayanan Baba Arimilli, both of Austin; John Steven Dodson, Pflugerville; Jerry Don Lewis, Round Rock, all of TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/344,061

(22) Filed: Jun. 25, 1999

(51) Int. Cl.[7] ............................................. G06F 9/312
(52) U.S. Cl. ..................................... 712/25; 712/207
(58) Field of Search ................... 712/216, 225, 712/207, 217; 711/137

(56) References Cited

U.S. PATENT DOCUMENTS

| | | | |
|---|---|---|---|
| 5,214,765 A | | 5/1993 | Jensen |
| 5,278,985 A | | 1/1994 | Odnert et al. |
| 5,307,477 A | | 4/1994 | Taylor et al. |
| 5,404,484 A | | 4/1995 | Schlansker et al. |
| 5,694,574 A | | 12/1997 | Abramson et al. |
| 5,717,882 A | * | 2/1998 | Abramson ............... 712/217 |
| 5,737,565 A | | 4/1998 | Mayfield |
| 5,758,051 A | | 5/1998 | Moreno et al. |
| 5,761,515 A | | 6/1998 | Barton et al. |
| 5,809,275 A | * | 9/1998 | Lesartre ............... 712/216 |
| 5,895,495 A | | 4/1999 | Arimilli et al. |
| 5,964,867 A | * | 10/1999 | Anderson ............... 712/219 |
| 5,987,594 A | * | 11/1999 | Panwav ............... 712/216 |
| 5,999,727 A | | 12/1999 | Panwar et al. |
| 6,006,326 A | | 12/1999 | Panwar et al. |
| 6,052,775 A | | 4/2000 | Panwar et al. |
| 6,058,472 A | | 5/2000 | Panwar et al. |
| 6,065,101 A | | 5/2000 | Gilda |
| 6,092,180 A | | 7/2000 | Anderson et al. |
| 6,145,059 A | | 11/2000 | Arimilli et al. |

OTHER PUBLICATIONS

U.S. application No. 09/344,023, Arimilli et al., filed Jun. 25, 1999.
U.S. application No. 09/344,060, Arimilli et al., filed Jun. 25, 1999.
U.S. application No. 09/338,946, Arimilli et al., filed Jun. 25, 1999.
U.S. application No. 09/344,057, Arimilli et al., filed Jun. 25, 1999.
U.S. application No. 09/344,058, Arimilli et al., filed Jun. 25, 1999.

* cited by examiner

Primary Examiner—Eric Coleman
(74) Attorney, Agent, or Firm—Casimer K. Salys; Bracewell & Patterson, L.L.P.

(57) ABSTRACT

A method for ordering the time of issuing of a load instruction from a lower level (L2) cache controller to its L2 cache in a data processing system to enable delivery of a load data at a time it is required by its downstream dependency is disclosed. The method comprises the steps of (i) determining a cycle of dependency (CoD) of the load data, where the CoD corresponds to an exact synchronized timer (ST) time, measured in cycles, on which said data is required by said downstream dependency from the L2 cache, and (ii) issuing the load instruction to said L2 cache at said time to synchronize a providing of said data to a pipeline of a system resource with a request by its downstream dependency. In the preferred embodiment of the invention, a distance of dependency (DoD) value is first appended to the load instruction. The DoD value is then converted to a CoD value when a miss occurs at the internal (L1) cache.

21 Claims, 6 Drawing Sheets

METHOD FOR JUST-IN-TIME DELIVERY OF LOAD DATA VIA CYCLE OF DEPENDENCY

CROSS-REFERENCE TO RELATED PATENT APPLICATIONS

The present invention is related to the subject matter of the following commonly assigned, copending U.S. patent applications Ser. No. 09/344,023 entitled "Processor and Method for Just-in-Time Delivery of Load Data Via Time Dependency Field" and filed Jun. 25, 1999; Ser. No. 09/344,057 entitled "Method for Just-In-Time Delivery of Load Data By Interviewing Caches" and filed Jun. 25, 1999; Ser. No. 09/344,058 entitled "Method for Just-In-Time Delivery of Instructions in a Data Processing System" and filed Jun. 25, 1999; Ser. No. 09/344,059 entitled "Method for Alternate Preferred Time Delivery of Load Data" and filed Jun. 25, 1999; Ser. No. 09/338,946 entitled "Method for Just-in-Time Delivery of Load Data Utilizing Alternating Time Intervals" and filed Jun. 25, 1999; and Ser. No. 09/344,060 entitled "Acknowledgement Mechanism for Just-in-Time Delivery of Load Data" and filed Jun. 25, 1999. The content of the above-referenced applications is incorporated herein by reference.

BACKGROUND OF THE INVENTION

1. Technical Field

The present invention relates in general to data processing systems and in particular to a method and system for ordering load instructions. Still more particularly, the present invention relates to a method and system for implementing just-in-time delivery of data requested by load instructions.

2. Description of the Related Art

In conventional symmetric multiprocessor (SMP) data processing systems, all of the processors are generally identical. The processors all utilize common instruction sets and communication protocols, have similar hardware architectures, and are generally provided with similar memory hierarchies. For example, a conventional SMP data processing system may comprise a system memory, a plurality of processing elements that each include a processor and one or more levels of cache memory and a system bus coupling the processing elements to each other and to the system memory.

Conventional SMP data processing system processors have a number of execution units. Superscalar multiprocessors typically have more than one of each execution unit. They typically have two floating point units (FPUs), two fixed point units (FXUs) and two load/store units (LSUs). The processors are designed for high frequency and their corresponding internal caches are typically very small in order to operate with the high frequency processor. In part due to their relatively small size, these internal caches sustain a large number of cache misses during requests for data. Data is thus stored in lower level (L2) caches to maximize processing speed. The processors typically send multiple load requests simultaneously or within close proximity to each other. This is particularly true in superscalar processors with multiple LSUs.

Traditionally, processors execute program instructions in order. With state-of-the-art processors, out-of-order execution of instructions is often employed to maximize the utilization of execution unit resources within the processor, thereby enhancing overall processor efficiency. Further, in these state-of-the-art processors that support out-of-order execution of instructions, instructions may be dispatched out of program order, executed opportunistically within the execution units of the processor, and completed in program order. The performance enhancement resulting from out-of-order execution is maximized when implemented within a superscalar processor having multiple execution units capable of executing multiple instructions concurrently.

Processors today often run numerous cycles ahead of the instruction stream of the program being executed. Also, on these processors, load instructions are issued as early as possible in order to "hide" the cache access latencies and thus allow ensuing dependent load instructions to execute with minimal delay. Additionally, compilers separate load instructions from their data dependency. For similar reasons, these techniques lead to requests for data which may not be required immediately. Finally, an L2 cache has a limited amount of wired connections for returning data. When data is sent prior to the time it is required, it utilizes valuable wired cache line resources which may be required for more immediate or important data requests.

In the prior art load instructions may be issued out of order. Often times this results in a load queue occupying valuable cache line resources or register space for many cycles before it is utilized by the program. When a large number of load instructions are present this results in loading down the critical cache and queue resources resulting in less efficient processing.

When the data cache is "bombarded" with load requests, no ordering information is included. The data cache is oblivious as to which load instruction to process and in which order. In traditional processors, ordering information is typically implied based on a "First Come First Serve" prioritization scheme. However, in some cases data is often not required by the processor or program at the time, or in the order, it is requested.

Thus many hardware and software limitations exist in the current method of loading data from a data cache. It is obvious that a more efficient means of loading data from a data cache needs to be developed. A processor should be able to issue its data requests so that the data cache can more optimally deliver the data only when it is actually required.

It would therefore be desirable to provide a method and system for improving the efficiency of load instruction processing and subsequent loading of data. It is further desirable to provide a method and system which allows for just-in-time delivery and/or time-ordered delivery of data during execution of an instruction set thus allowing data to be loaded from a data cache at the time when needed within the program execution stream.

SUMMARY OF THE INVENTION

It is therefore one object of the present invention to provide an improved data processing system.

It is another object of the present invention to provide an improved method and system for efficiently managing multiple load requests to a data cache.

It is yet another object of the present invention to provide a method and system for implementing just-in-time delivery of data requested by load instructions.

The foregoing objects are achieved as is now described. A system for time-ordered execution of load instructions is disclosed. More specifically, the system enables just-in-time delivery of data requested by a load instruction. The system consists of a processor, an L1 data cache with corresponding L1 cache controller, and an instruction processor. The instruction processor manipulates an architected Time Dependency Field (TDF) of a load instruction to create a Distance of Dependency (DoD) bit field. The DoD bit field holds a relative dependency value which is utilized to order the load instruction in a Relative Time-Ordered Queue (RTOQ) of the L1 cache controller. The load instruction is sent from RTOQ to the L1 data cache at a particular time so that the data requested is loaded from the L1 data cache at the time specified by the DoD bit field. In the preferred embodiment, an acknowledgement is sent to the processing unit when the time specified is available in the RTOQ.

The above as well as additional objects, features, and advantages of an illustrative embodiment will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF ILLUSTRATIVE EMBODIMENT

Figure 1:
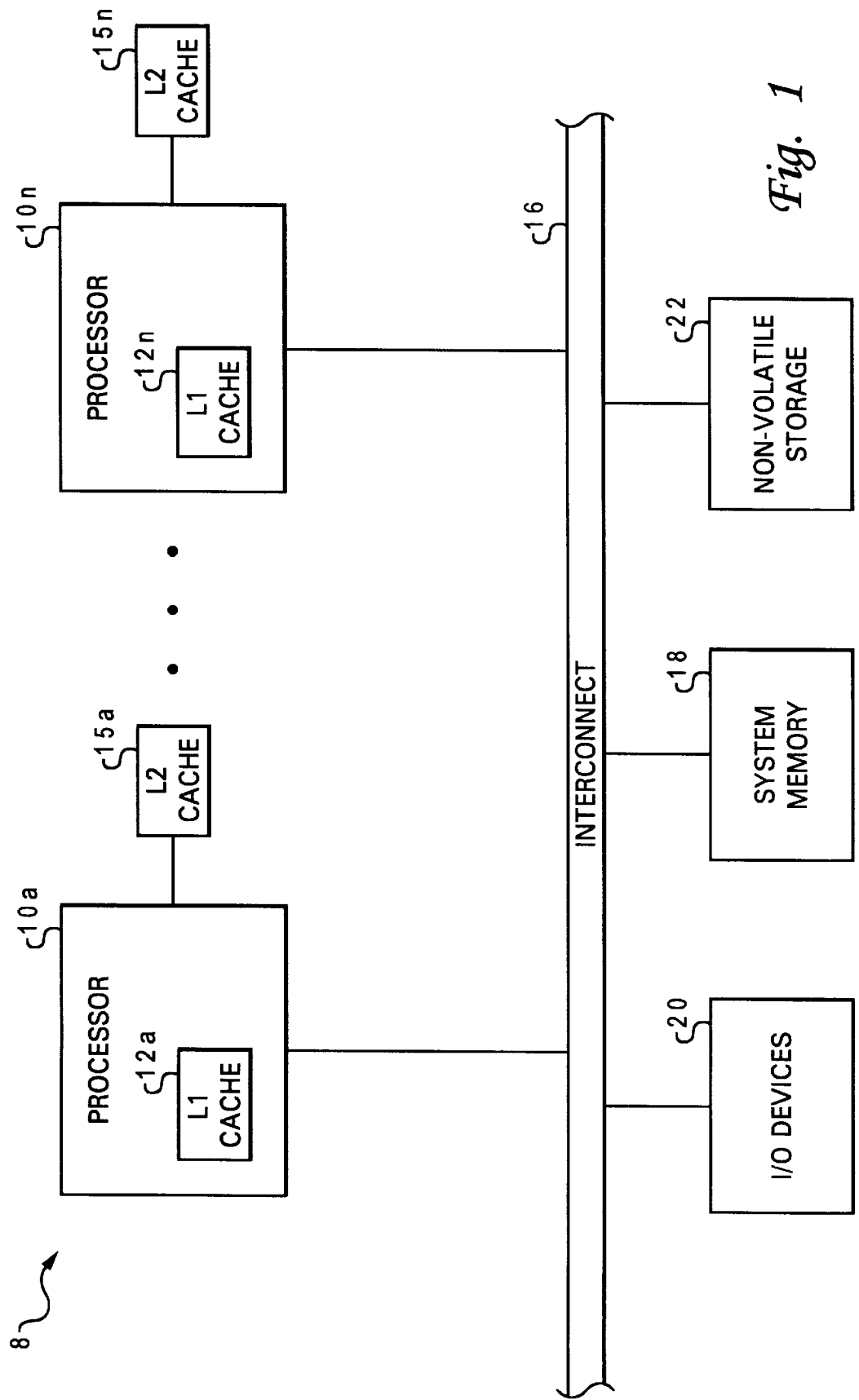
FIG. 1 depicts a high level block diagram of a multiprocessor data processing system in accordance with the present invention.

With reference now to the figures, and in particular with reference to FIG. 1, there is illustrated a high level block diagram of a multiprocessor data processing system in accordance with the present invention. As depicted, data processing system 8 includes a number of processors 10a–10n. Processors 10a–10n preferably comprises one of the PowerPC™ line of microprocessors available from International Business Machines Corporation; and are superscalar with full out-of-order execution. Those skilled in the art will appreciate that other suitable processors can be utilized. In addition to the conventional registers, instruction flow logic and execution units utilized to execute program instructions, each of processors 10a–10n also include an associated on-board level one (L1) data caches 12a–12n, which temporarily holds data that is likely to be accessed by the associated processor.

In order to minimize latency, data processing system 8 may also include one or more additional lower levels of cache, such as level two (L2) caches 15a–15n. L2 caches 15a–15n are depicted as off-chip although it is conceivable that they may be on-chip with L1 caches 12a–12n. Also, the L2 caches 15a–15n could be traditional inline or lookaside w.r.t. the interconnect, as well as inclusive or non-inclusive of their respective L1 caches 12a–12n. L2 caches 15a–15n can typically store a much larger amount of data than L1 caches 12a–12n, but with a longer access latency. For example, L2 caches 15a–15n may have a storage capacity of 4 M-bytes and an access latency of 20 cycles, while L1 caches 12a–12n may have a storage capacity of 32 kilobytes with an access latency of 2 cycles.

As illustrated, data processing system 8 further includes input/output (I/O) devices 20, system memory 18, and non-volatile storage 22, which are each coupled to interconnect 16. I/O devices 20 comprise conventional peripheral devices, such as a display device, keyboard, and graphical pointer, which are interfaced to interconnect 16 via conventional adapters. Non-volatile storage 22 stores-an operating system and other software, which are loaded into volatile system memory 18 in response to data processing system 8 being powered on. Of course, those skilled in the art will appreciate that data processing system 8 can include many additional components which are not shown in FIG. 1, such as serial and parallel ports for connection to network or attached devices, a memory controller that regulates access to system memory 18, etc.

Interconnect (system bus) 16, which can comprise one or more buses or a cross-point switch, serves as a conduit for communication transactions between processors 10a–10n, system memory 18, I/O devices 20, and nonvolatile storage 22. A typical communication transaction on interconnect 16 includes a source tag indicating the source of the transaction, a destination tag specifying the intended recipient of the transaction, an address, and data. Each device coupled to interconnect 16 preferably snoops all communication transactions on interconnect 16.

The execution circuitry of processors 10a–10n each comprises multiple execution units, including two fixed-point units (FXU), two load/store units (LSU), and two floating-point units (FPU). As is well-known to those skilled in the computer art, each of the execution units typically executes one or more instructions of a particular type of instructions during each processor cycle.

Processor 10 employs both pipelining and fully out-of-order execution of instructions to further improve the performance of its superscalar micro-architecture. Accordingly, instructions can be executed by FXU, LSU, and FPU in any order as long as data dependencies are observed.

As its name implies, LSU typically executes load and store instructions which either load data from L1 cache or memory (i.e., either L2 data cache 15a . . . 15n or main memory) into selected GPRs, GPR rename buffers, FPRs or FPR rename buffers, etc., or which store data from a selected one of GPRs, GPR rename buffers, FPRs, or FPR rename buffers, etc., to memory. The present invention extends the functionality of the LSU during loading of data to allow just-in-time delivery of data as will be described below.

Although the invention is being described with reference to the above mentioned data processing systems, these references are in no way meant to be limiting on the invention. Other system types and architecture may be utilized in implementing the invention. For example, although FIG. 1 depicts only two levels of cache, the memory hierarchy of data processing system could be expanded to include additional levels (L3, L4, etc.) of serially-connected caches. Finally, other embodiments may provide that any level cache consist of a single cache, for example, a single L2 cache may be utilized within the data processing system and accessible to a number (cluster) of the processors simultaneously. This latter embodiment is presented in FIG. 3A which follows. A simple L1 internal and L2 external cache topography is utilized in the illustrations for simplicity.

The preferred embodiment of the present invention appends a time dependency field (TDF) to load instructions. The TDF is a set of bits which is populated with information which establish on which cycle to load data requested by the load instruction, (i.e., when to send the load request to L1 or L2 data cache to effectuate delivery of data at a desired time.) In the preferred embodiment, this is referred to as "just-in-time" delivery of data. According to the present invention, distance refers to the time period (number of cycles) which exists between the processor issuing a load instruction and when the corresponding load data is actually required by a dependent instruction (i.e., its downstream dependency). The processor launches load instructions and sends the time dependency information with the instruction regarding when the load data is needed by the downstream dependency (for example, at 50th cycle). In the preferred embodiment, this bit field acts as a hint only and depends on the availability of system resources, and other factors. The TDF may be included within the instruction set architecture (ISA), or appended during compilation, or dynamically created by hardware during instruction processing.

Another embodiment of the invention is implemented with multiple TDFs appended to the load instructions as will be discussed below. Those skilled in the art understand that any number of TDF fields with differing functionalities may be utilized within the scope of the invention, and that the number of fields actually presented herein are done so for illustrative purposes only. The configuration of these TDF fields with respect to a regular load instruction is illustrated in FIG. 2.

Figure 2:
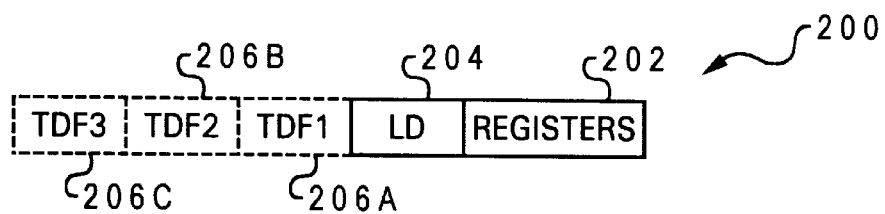
FIG. 2 is a block diagram of a load instruction with appended time dependency field (TDF) in accordance with a preferred embodiment of the present invention.

FIG. 2 depicts a load instruction 200 consisting of information bits such as register location 202 (i.e., where to load the data), and load data requests 204 identifying which data to load. Also, depicted are first TDF 206A, second TDF 206B, and third TDF 206C (collectively referred to hereinafter as TDF 206 unless specifically named or excluded) appended according to the preferred embodiment of the invention. For simplification, discussions of the invention will focus on the first TDF 206A which is utilized as the DoD and CoD field in the preferred embodiment. Second TDF 206B utilized as Alternate Preferred Time (APT) and third TDF 206C utilized as a range of dependency (RoD) will be discussed in detail in the section titled "Multiple TDF Method" below. TDF 206 holds the time to load information. This information is utilized to order the load instruction in a time-ordered queue of a data cache controller. The load instruction 200 is then sent to the data cache at a particular time to allow the data to be loaded at the time specified in TDF 206. The TDF field is not present in traditional instruction set architectures (ISA). The dotted lines in FIG. 2 indicates that TDF 206 may or may not be present depending on the ISA of the processor. However, the inventors envision a new ISA which allows a set of bits to be specifically identified as a TDF 206. This new ISA includes an Architected TDF (ATDF) which is created by the compiler. Another embodiment utilizes currently available bits in ISA which are redefined to be utilized as the ATDF. The ATDFs contain general dependency information provided during compilation of the instructions. ATDF (TDF 206) are later provided program specific dependency information and converted to an Internal TDF (ITDF) via one of two methods discussed with reference to FIG. 4. Internal TDF (ITDF) (or DoD field) is dynamically created during instruction processing. In multiple TDF embodiments equivalent number of ITDFs are created and include DoD field, Alternate Preferred Time (APT) and range of dependency (RoD) field.

The ITDF may contain either Distance of Dependency (DoD) or Cycle of Dependency (CoD) information. DoD refers to a relative time (number of cycles) between the load request and the load data (for example, in 15 cycles). CoD refers to an absolute time based on a Dependency Synchronized Timer (DST) (for example, at cycle 252). DST is basically a timer within the processor which is synchronized with the DST of the other system components which utilize just-in-time data delivery techniques. For illustrative purposes, it is assumed that a DST runs for 512 cycles (9 bit clock) each period. A load instruction with DoD of 100 cycles issue the load request in time for the data to arrive on/immediately after 100 cycles, irrespective of the DST. However, a load instruction with CoD value of 100 when the DST clock is at 75 would issue the load request in time for the data to arrive on/immediately after 25 cycles (100–75). The various differences in utilization and terminology will become more apparent with reference to FIG. 4.

The preferred embodiment of the invention allows for the storage of an "absolute" time in the CoD field corresponding to the DST time the data is actually provided to the execution units. In another embodiment the CoD corresponds to DST time the data is actually requested from the L2 cache. Depending on the availability of system resources, the desired absolute time may or may not be available and an "imprecise" time (within a range of cycles from the exact time, will be assigned to the load instruction as will become clear with the description of FIG. 4 and FIG. 7. The utilization of DoD and CoD with load instructions leads to "just-in-time" data delivery.

In the preferred embodiment, the time required for data to travel from the data cache to the requesting process is utilized as an offset to the DoD time and subsequent CoD time (also the RD and SD time). This offset allows the load instruction to be issued to the data cache at a time which results in the data arriving at the execution unit at the desired time. The offset may be utilized within the calculation of original DoD value or utilized by the time-ordered queue to offset each value during a snoop. Alternatively, the time ordered queue may be designed with a delay equal to the offset.

The preferred embodiment of invention stores "relative" times in the DoD field. Relative time is based on an analysis of all the load instructions and their respective dependent instructions. The instructions are received by L1 cache during program execution either simultaneously or in program order. The L1 cache reschedules them for execution based on their respective DoD fields, thus optimizing the L1 cache resources.

In the preferred embodiment, one of two dynamic hardware implementations is utilized for appending the priority field. The first preferred implementation appends the DoD functionality during the "processing" of instructions in an instruction processor located within the processor of the data processing system. The second embodiment is based on an re-configured or newly designed ISA which supports having a TDF appended to regular load instructions as described above. For both embodiments, the actual DoD information is placed in the DoD field (the new ITDF) by a dependency component/logic within (or external to) the instruction processor.

Figure 4:
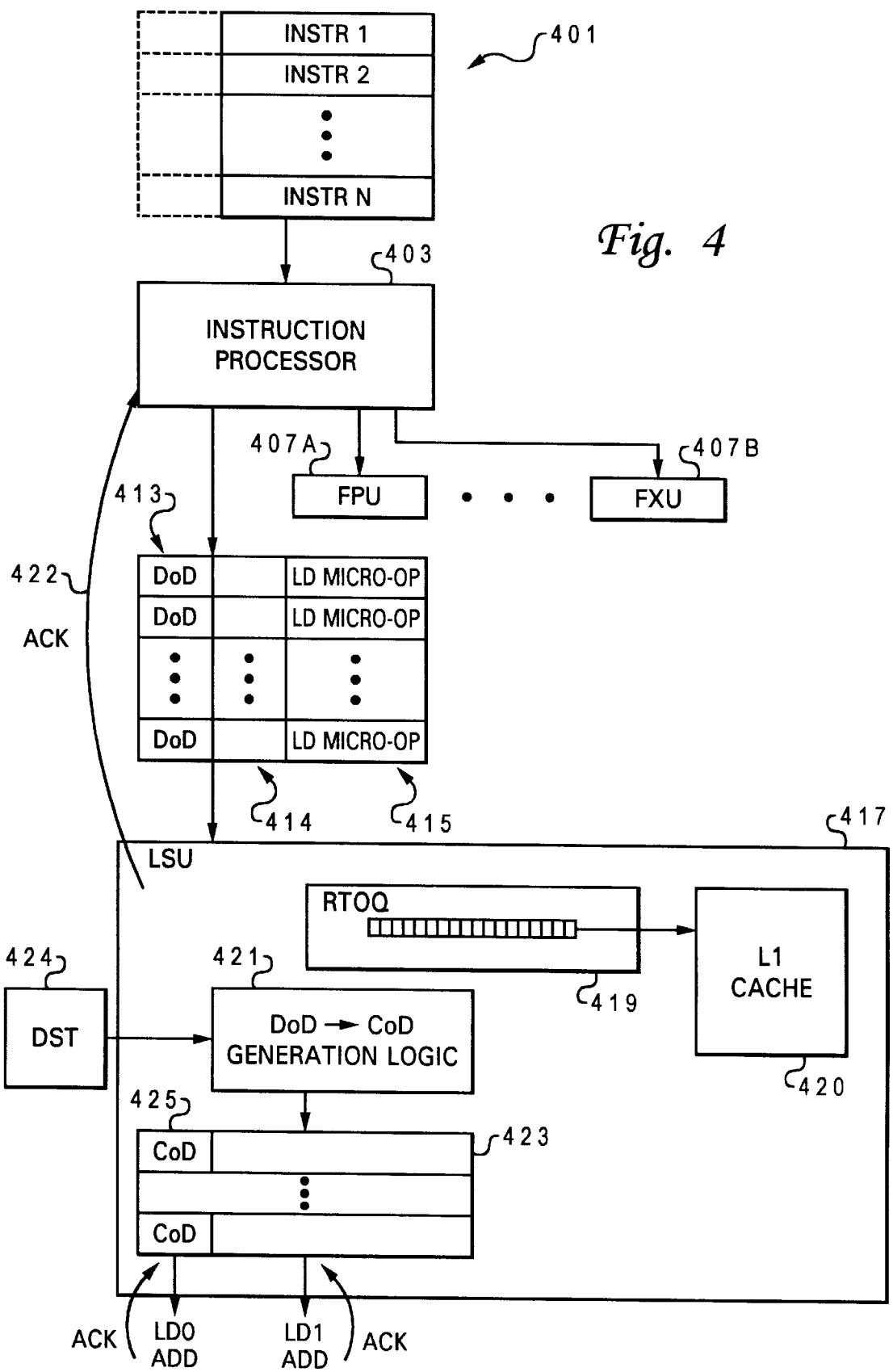
FIG. 4 is a block diagram illustrating the generating of a load instruction with appended TDF and subsequent utilization of the TDF within the processor in accordance with one embodiment of the present invention.

Turning now to FIG. 4, there is depicted a logical view of a dynamic hardware implementation of appending (if necessary) and/or setting the TDF and subsequent utilization of the value in that field to order load instructions from L1 cache. An architected instruction stream 401 (such as, X86, PowerPC, etc.) comprising of load instructions of FIG. 2 and other instruction types is sent through an instruction processor 403 where the instructions are processed and converted into hardware specific instructions. Instruction processor 403 typically reformats, cracks, combines and reschedules the architected instructions based on the processor design. Those skilled in the art are familiar with an instruction processor which takes as input numerous architected instructions and produces an output stream of micro-instructions which are specific to the underlying hardware. For example, 3.32 bit architected instructions may yield five 19 bit micro-instructions (micro-ops). These unique micro-instructions include load micro-instructions (micro-ops) 415 and other types of micro-instructions (now shown). The present invention is concerned only with the novel methods of utilizing an instruction processor to determine a DoD and placing that DoD information in a DoD field which may be either architected by the ISA or created within the instruction processor 403. Creating hardware specific micro-ops is known in the art.

In the illustrative embodiment, micro-ops are separated into load micro-ops 415 and other types of micro-ops. The other types of micro-ops are sent to their respective execution units including FPU 407A and FXU 407B. Load micro-ops 415 with their appended DoD field are sent to LSU 417.

The appended load instructions which were originally in program execution order are given a DoD field 413 and other fields 414 utilized during processing. Those skilled in the art are familiar with these other fields 414 and processes by which these other fields 414 are appended. The value within DoD field 413 is utilized within LSU 417 to determine "when" to load requested data for each load micro-op 415. Load micro-ops 415 are then sent to LSU 417 where they are scheduled within the relative time-ordered queue (RTOQ) 419 of L1 cache controller (not shown). When a load request is triggered by the processor, the L1 cache controller determines if the data is available in L1 cache 420 (i.e. a hit). If the data is available, then the load request is sent to RTOQ 419 which holds the request until the time distance specified (i.e. # of cycles) in DoD field 413.

The DoD functionality assumes a non-blocking fixed-delay path from the instruction processor 403 to LSU 417 to respective dependent load instruction (i.e., a known and invariant number of cycles for transmission of the load micro-op 415 from the instruction processor 403 to LSU 417). This guarantees the correct reference cycles for DoD.

When a hit occurs at L1 cache 12 and the RTOQ 419 is able to schedule the load micro-op 415 at the cycle requested, an acknowledgement (ACK) signal 422 is sent to the instruction processor which utilizes this information during future ordering (or DoD evaluation) of instructions. The functionality of the ACK is described in greater detail below.

In the event that a miss occurs, LSU 417 then the request for the load data is sent to L2 cache (not shown). This invention implements a series of processes to convert DoD field 413 to a CoD field 425 for utilization by external components such as the L2 cache and memory. This conversion process is necessary to implement a dependency mechanism at the general system level. The time of propagation of the load request on the system bus as it snoops the external components is not readily ascertainable. It is dependent on system loading, availability of the system bus, etc. These various factors makes it impossible to determine a "relative" time for the load request to be sent to the external component to retrieve the data. (Also, for the same reasons, it is difficult to ascertain when the data will actually arrive at the processor.) Thus DST 424 is utilized to synchronize the system components. DST 424 then becomes a reliable reference by which the load request may be dispatched at the correct cycle within the external components. The DST time for loading the requested data is represented as a CoD. DoD to CoD conversion generation logic 421 is utilized with an input from DST 424 to create a load instruction 423 with appended CoD field 425 as described below.

In the preferred embodiment, the processing of DoD to CoD generation logic 421 requires DST 424 and a non-conventional adder (described with reference to FIG. 5 below) which performs a "X" bit to "X bit+even/odd bit" addition. The process may be completed with a conventional adder which for example, takes a 40 bit clock and adds it to a 9 bit DoD field to create a very large 40 bit cycle output. This approach, however, requires significant amounts of hardware to implement. Additionally, with this approach, the clock would not be able to handle carry overs and would require suspending the setting of CoD fields for clock cycles close to the end of the period, thus requiring even more logic and hardware to implement.

Figure 6:
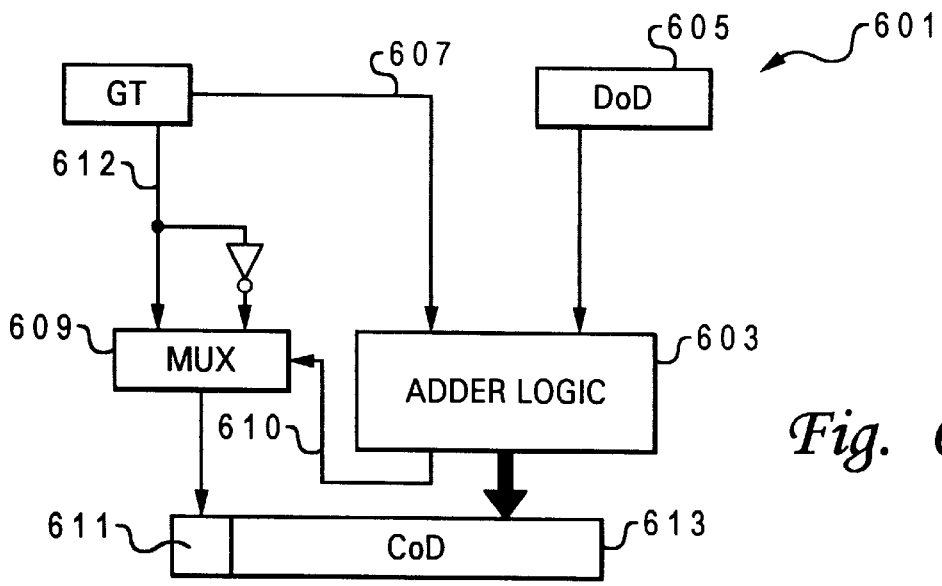
FIG. 6 depicts an adder component logic for converting a Distance of Dependency (DoD) field to a Cycle of Dependency (CoD) field in accordance with a preferred embodiment of the present invention.

The preferred embodiment of the invention utilizes the non-conventional adder functionality to append a bit which indicates whether a load request is on an odd or even cycle. FIG. 6 illustrates the adder 601 comprised of adder logic 603 with a first input 605 being the DoD value and a second input 607 being the (9 bit) DST value. An additional logic structure (MUX) 609 has as inputs the DST current status 612 (i.e. even or odd) and the carry over value 610 of the adder logic 603. MUX 609 determines whether the time is in an even or odd cycle and stores the answer in even/odd bit 611 of CoD field 613. If there is a carry over value 610, then MUX 609 changes the value of the DST current status 612. In this embodiment, CoD field 613 always consist of one additional bit than DoD field. Only the CoD field is shown in this embodiment, however it is understood that this field is appended to a load instruction.

In an illustrative example, assume that a DST goes through 512 cycles each period (i.e., a 9 bit clock) and that the maximum CoD for any load instruction is 500 cycles (i.e., also a 9 bit CoD field). If a load instruction with a DoD value of 300 cycles is received as an input to the adder along with a DST time of 280, then the load data is delivered on cycle 68 of the next DST period. The DST time 68 is stored within the 9 bits of CoD. However, this absolute time refers to the next time period, otherwise the dynamic time ordering queue (discussed in FIG. 3 below) becomes confused about where in the queue to place the load instruction. Several different implementations of resolving this uncertainty, not previously known in the art, will become clear to those skilled in the art in light of the above stated disclosure herein.

In the preferred embodiment, the DST is assumed to be alternating between even and odd time periods. For illustrative purposes, an even period is represented by a value of 1 and an odd period is represented by a value of 0. The adder appends the odd/even bit with its respective value, determined based on whether or not there is a carry over during the known (i.e. even or odd) DST period.

In yet another embodiment, the DST is always assumed to be even (or odd) for the present cycle and all load instructions for that cycle are given the respective bit, say 0. When the DST period rolls over, all load instruction still left are assumed to be on the current cycle and their even/odd bit changed to 0. The newly added instructions which have a carry over are stored with a 1 even/odd bit and those without a carry over are given a 0 even/odd bit.

The embodiments presented herein assume that the DoD field holds a value which is less than the DST period; however, those skilled in the art will understand that the various functionalities of the invention may be implemented with DoD values larger than the DST cycle. In such a case, additional logic must be included to allow for the DoD and CoD value to be derived at some distant DST period.

For illustrative purposes, it is assumed that the non-architected micro-ops include only 19 bits. Assuming further that the TDF field is made up of 9 bits, then the resulting DoD load micro-ops are 28 bits and the corresponding CoD load micro-ops are 29 bits. The preferred embodiment is implemented on a data processing system in which the hardware components, the processor, the LSU and L1 and L2 cache, and bus connectors, etc. are designed to recognize a 29 (or 28) bit micro-op (i.e. the extra 9 bits of DoD and/or 10 bits of CoD) and execute the load instructions with these additional bits appended.

Figure 3B:
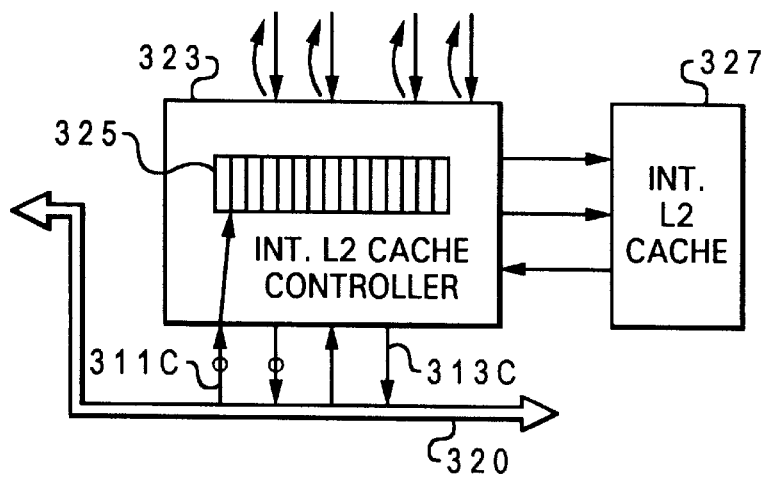
FIG. 3B depicts a block diagram of an intervening L2 cache in accordance with one embodiment of the present invention.
Figure 3A:
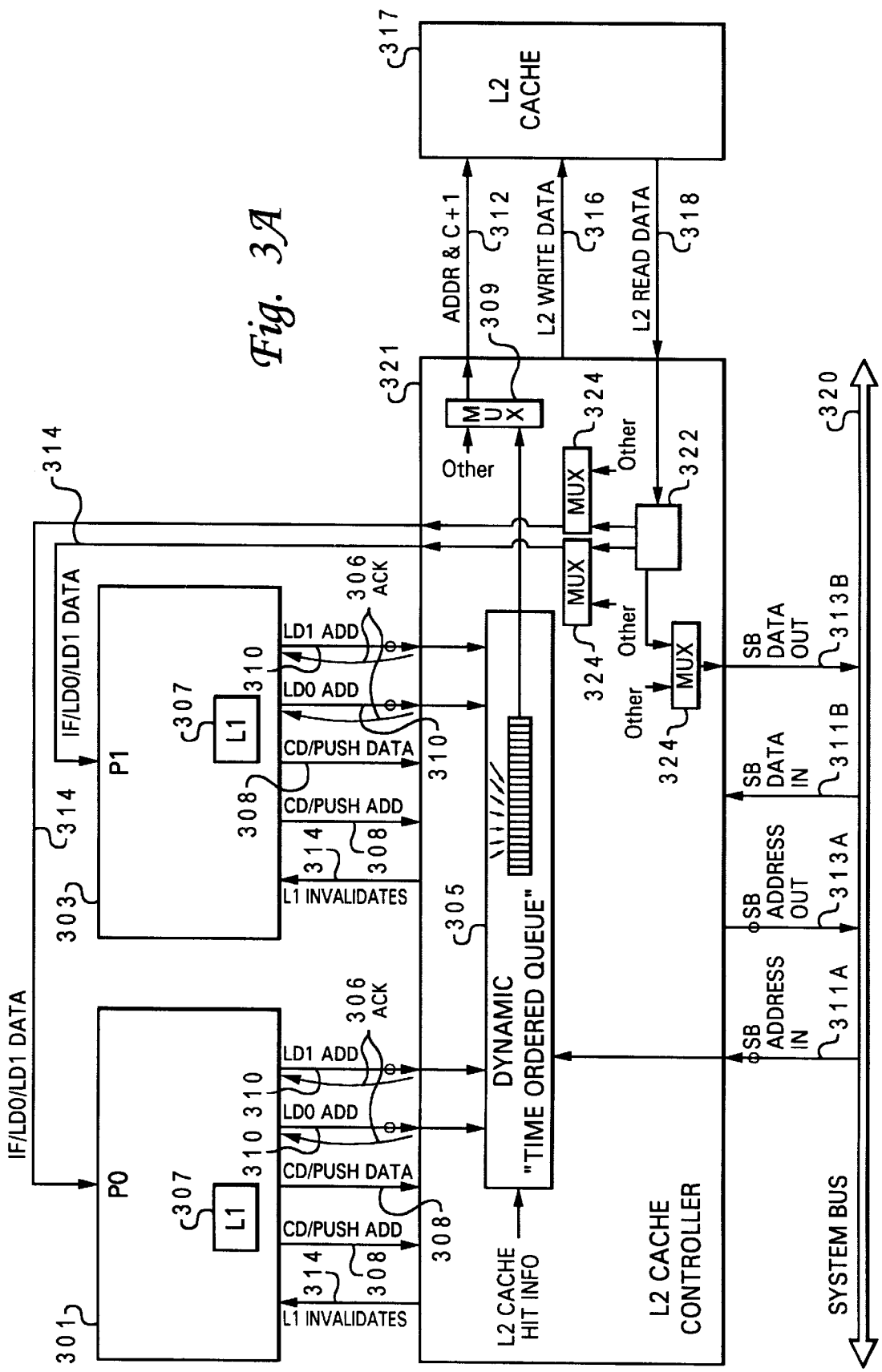
FIG. 3A depicts a detailed block diagram of a load store unit of a processor coupled to an L2 cache controller and L2 cache utilized to implement the preferred embodiment of the present invention.

With reference now to FIG. 3A. FIG. 3A depicts multi-processor access to a lower level data (L2) cache. Processor 301 and Processor 303 (collectively referred to as processors) both access a single L2 cache 317. Both processors 301 and 303 contain at least one load unit (L1) 307 and are connected to L2 cache 321 via a series of outgoing interconnects (buses) which include cast out/push address bus 308 and load address bus 310, and a series of incoming interconnects which include L1 invalidates bus 314 and acknowledgement bus 306. Interconnects for load address 310 contain the load instruction being sent to L2 cache. Load address 310 has an appended cycle of dependency (CoD) field which will be discussed in detail below. Return bus 314 also connects L2 cache 317 to processors 301 and 303. Data buses collectively are utilized for transmitting request for data and data to and from L2 cache 317. L2 cache controller 321 contains a directory (not shown) and a dynamic "Time-Ordered Queue" (DTOQ) 305 which orders load and other requests for data from L2 cache 317. L2 cache controller 321 also contains various logic structures 309, 322 and 324 utilized during fetch and receive stages of data requests. Data requests from LSU (L1) 307 are sent as load address 310 to L2 cache controller 321. L2 cache controller checks its directory structure to determine if the result of the request is a "hit" or "miss." If it is a hit (i.e. data is present in L2 cache), then load address 310 is sent to DTOQ 305 to reserve a queue position for delivery of the load data. DTOQ 305 orders load address 310 according to its CoD and transmits load address 310 at the precise time requested per its CoD to L2 cache 317. L2 cache 317 is gated by a MUX 309 which accepts load address 310 and other simultaneous requests to L2 cache 317. During time-ordered queuing, when the load address 310 is placed in the queue, (i.e., the requested cycle for delivery of load data is available, an acknowledgement (ACK) 306 is transmitted back to the processors 301 and 303.

FIG. 3A also depicts system bus (SB) 320 which provides an interconnect between L2 cache controller 321 and other system components (not shown). System bus (SB) 320 has outgoing interconnects 311 including SB address in bus 311A and SB data in bus 311B which snoops L2 cache 317 via L2 cache controller 321. SB 320 also has incoming interconnects, SB address out bus 313A and SB data out bus 313B. Requests for data from L2 cache 317 are sent to L2 cache controller 321 via SB address in bus 311A. In the illustrative embodiment, SB address in bus 311A also contains a CoD field utilized for ordering its request in dynamic time ordering queue 305.

L2 cache 317 receives load requests 312 and L2 write requests 316 as inputs. Once a load request 312 is received at L2 cache 317, corresponding data is immediately located via address information as is known in the art, and outputted via L2 read data 318. L2 read data 318 is passed through a first logic structure 322 which determines where to deliver the data. Then L2 read data 318 passes through MUX 324 shown with other inputs. Data requested by L1 is sent to processors 301 and 303 via return buses 314. Data requested by external components connected to system bus 320 are sent to external components via SB data out L2 cache 317 transmits an ACK signal 306 back to processors 301 and 303. An ACK signal 306 is sent only when load request provides a hit and can be scheduled for the requested cycle. If a hit occurs but there is a conflict with the desired time requested (for example, another load request has already been allotted the time slot), no ACK is sent. ACK signal 306 may be a packet, a 1 bit pulse, or any other means utilizing minimal system resources by which L1 cache is made aware of the availability of the requested time slot for delivery of the data (i.e., the data will be delivered at the cycle specified in the CoD field.). ACK signal 306 allows the arbiters and other resources within the processor to more opportunistically prepare for delivery of load data. ACK signal as utilized herein provides level information to allow the scheduler or processor to re-optimize based on the availability of lower level resources. ACK signal 306, once received, indicates to the processor that it may reserve its pipeline and other resources to that data at the time specified within its CoD field.

If no acknowledgement is received, processors 301 and 303 have to predict possible return path and reserve bubbles in pipeline for when it expects the data. This may involve an associative compare process with other data and instructions to determine where data belongs. An incorrect prediction results in bubbles in the pipeline and less efficient processing.

Another embodiment of the invention occurs when there is an L2 miss (i.e., requested data is not in L2 cache). FIG. 3B depicts an intervening cache 327 with similar configuration as the cache of FIG. 3A. Often, data requested may be in another location, either in memory or another parallel L2 cache (intervening cache) 327 coupled to another processor. The load address is sent via SB address out bus 313A and system bus 320 to other caches. SB address out 313A contains the load request which includes the appended CoD field. This request is sent via system bus to intervening cache 327 which snoops the request and represents the input of SB address in bus 311C of this structure. The same process of ordering the load instructions utilizing the CoD field occurs within intervening cache 327 utilizing intervening cache controller 323 and intervening cache DTOQ 325. When a hit occurs, however, the data is sent back to processors 301 and 303 via SB Data out bus 313C and system bus 320 and received at SB data in bus 311B.

It is expected that various other system components, such as memory, may contain a dynamic time-ordered queue and that such configurations are covered within the scope of this invention. This allows for a system architecture which time orders all requests for information within the system. The system's bus therefore becomes a conduit for transmitting these various requests with CoD fields attached from any component to the next. In the preferred embodiment, no acknowledgement is sent if the L2 cache results in a miss, although the present invention does foresee that an ACK signal 306 can be architected on system bus if desired and data retrieved from an external location.

Figure 5:
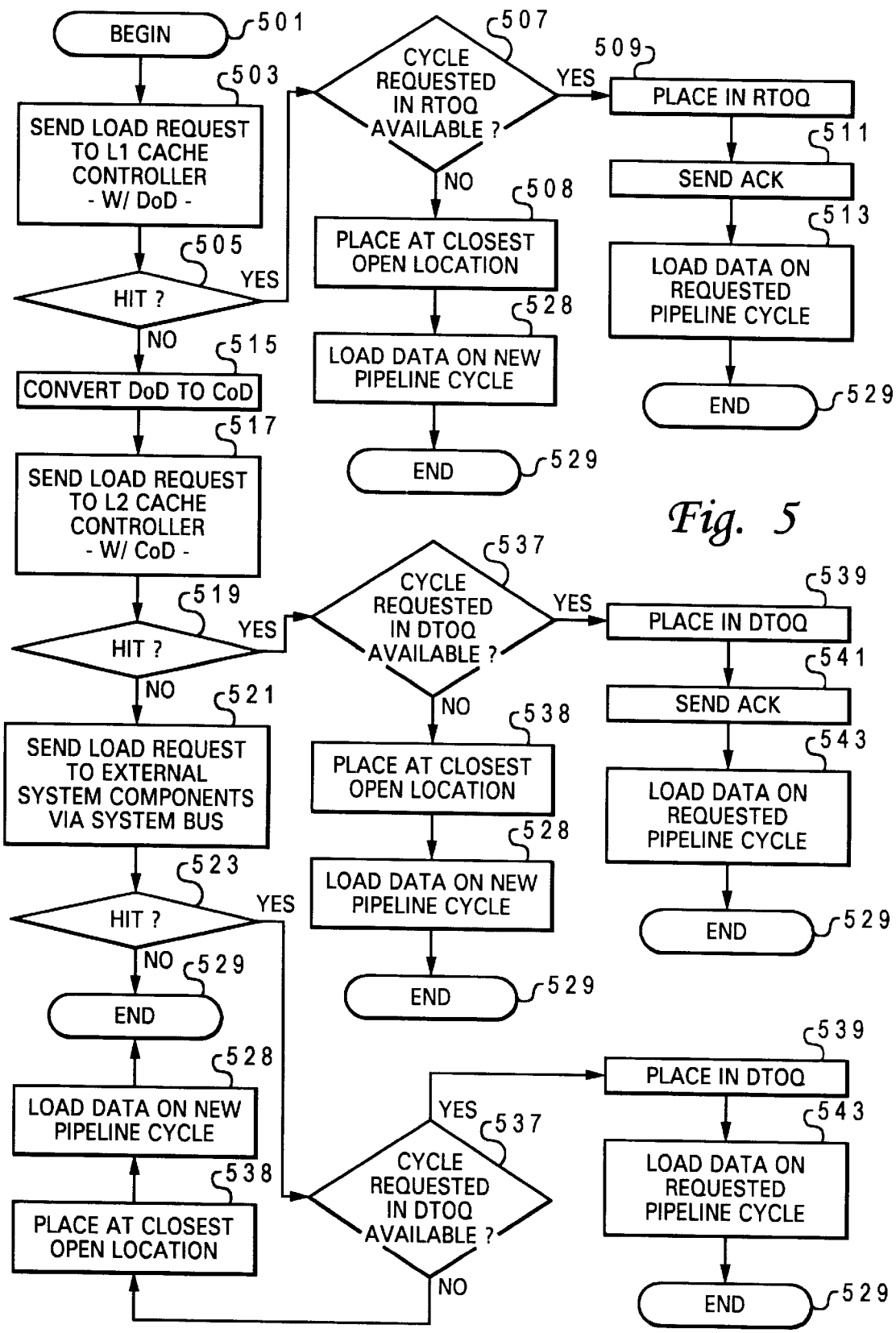
FIG. 5 depicts a logic flow chart of the process of loading data with a load instruction containing a TDF in accordance with a preferred embodiment of the present invention.

Turning now to FIG. 5, there is illustrated a logical flowchart of the process of loading data utilizing a load instruction with appended DoD field. The process begins at step 501. A load request is sent to L1 cache controller with an appended DoD field (step 503). The L1 cache controller searches its directory to determine if a hit (step 505). If a hit, then the L1 cache controller checks its RTOQ to see if the requested cycle is available (step 507). If it is not available, then the load request is placed at the closest available location within the RTOQ (step 508) and the load data is sent on a different cycle (step 528). The process then ends (step 529). If, the cycle is available, the load request is placed in the queue at that location (step 509). An acknowledgement signal is sent to the instruction processor (step 511). The data is loaded at the requested pipeline cycle (step 513), then the process ends (step 529).

Returning now to the determination of a hit (step 505). When there is no hit (i.e. a miss occurs), the DoD is converted to a CoD (step 515) as described above. The load request is sent to the L2 cache controller with the appended CoD (step 517). L2 cache controller searches its directory to determine if a hit (step 519). If a hit, then the L2 cache controller checks its DTOQ to see if the DST cycle in the DTOQ is available (step 537). If it is not available, then the load request is placed at the closest available location within the DTOQ (step 538) and the load data is sent on a different cycle (step 528). The process then ends (step 529). If the DST cycle is available, the load request is placed in the DTOQ at that location (step 539). An acknowledgement signal is sent to the processor (step 541). The data is loaded on the requested DST cycle (step 543), then the process ends (step 529). If not a hit, then the load request is sent to the external system components via the system bus (step 521). The load request searches the directory structures of these external component to determine if a hit (step 523). If a hit, and the system component has a time order queue, the system determines if the cycle requested in the time-ordered queue is available (step 537). If it is available, the load request is placed in the queue (step 539) and the data loaded on the requested DST cycle (step 543). Then the process ends (step 529). If it is not available, however, the load request is placed at the closest available location (step 538) and the data loaded on that cycle (step 528). Then the process ends (Step 529). The process also ends (step 529) when no hit occurs at the external system components.

Those skilled in the art will appreciate that a variety of process steps are possible when searching external system components and that only one is presented herein for simplicity and brevity. For example, no limit exists on the levels of caches available to a processor. The invention is easily extended to cover processors with level 3 (L3), level 4 (L4) and other lower level caches. Also, although FIG. 5 illustrates numerous steps in a sequential fashion for the sake of simplicity, those skilled in the art will appreciate that many of the operations to which the steps pertain may actually be age performed in parallel or in a different order.

MULTIPLE TDF METHOD

In the multiple TDF embodiment, the second TDF field is referred to as Alternate Preferred Time (APT) and the third TDF field the range of dependency (RoD). The first TDF (DoD or CoD) is the desired time dependency. However, during processing, the requested TDF may have a conflict with other cache resources. This APT may then be utilized to select a clock cycle. Thus APT may be a neighboring cycle (i.e., 1 cycle away) or many cycles away from the desired time dependency. In the preferred embodiment, the APT is the same cycle on the next natural loop of the processor pipeline. The utilization of multiple TDF fields may also include a third TDF field which provides a range of dependency (RoD). RoD refers to a number of cycles before or after the desired cycle (for example, a desired cycle of cycle 50, with a range of 5 cycles allows the data to be loaded anytime between cycle 45 and cycle 55). In the preferred embodiment, the RoD is equally spread around CoD or DoD, however, it is contemplated that the range may be skewed. The invention may allow for a skewed range. In the above example, for instance, data may be loaded anytime between cycle 48 and 57, or 43 and 52 when the range is 10. Those skilled in the art understand the concept of a skewed range to increase processor efficiency.

During DoD to CoD conversion, the original APT (and RoD) values are also adjusted to reflect corresponding cycles based on the DST time. Skewing the range may be required to enable greater efficiency in providing data to a process which may prefer the data earlier or later when the desired time is not available. The RoD, when utilized as a raw number (range of 10) around the desired time is not adjusted during DoD to CoD conversion.

Figure 7:
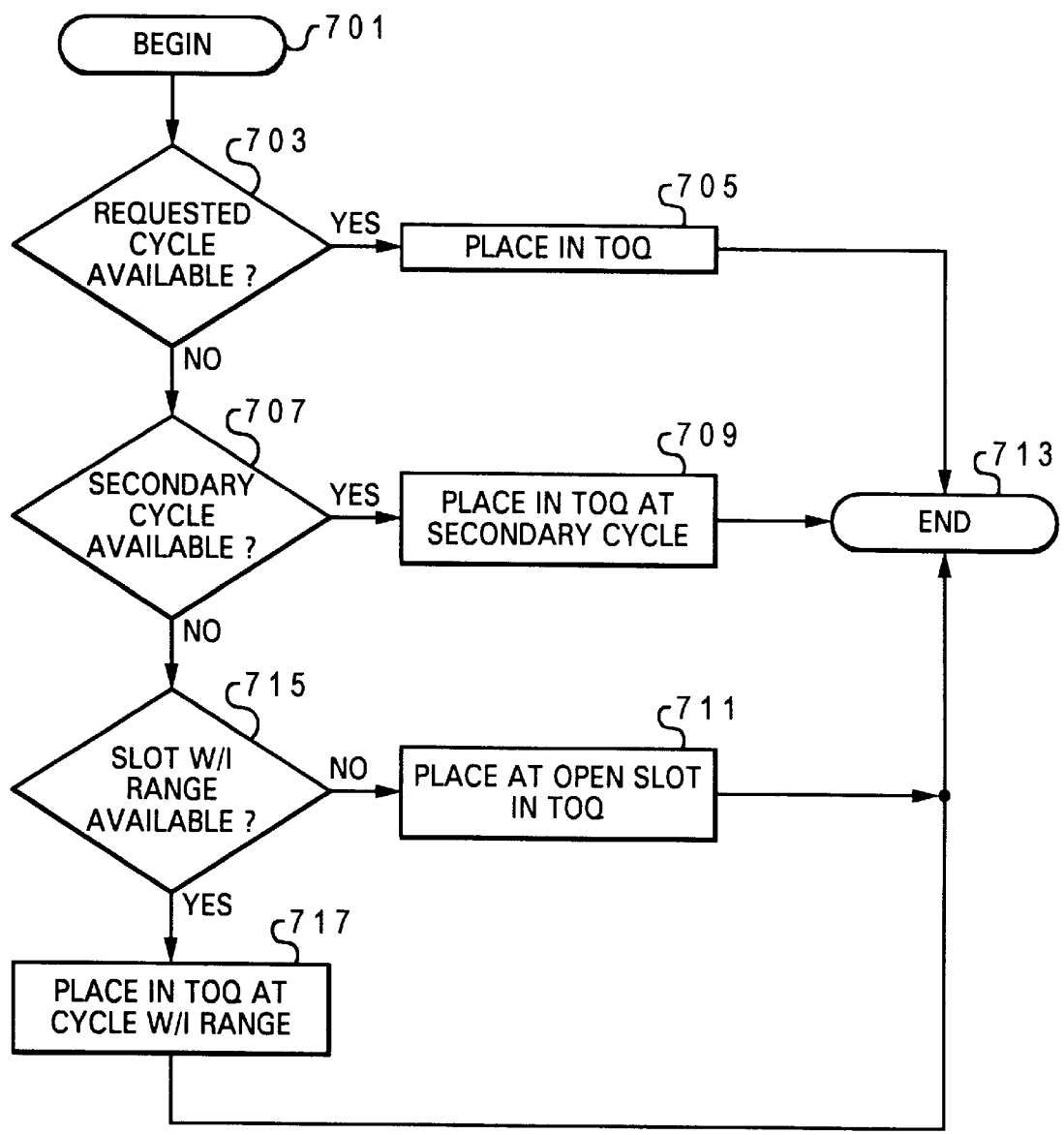
FIG. 7 depicts a flowchart of a multiple TDF load request in accordance with a preferred embodiment of the present invention.

FIG. 7 depicts the process of ordering load instructions of FIG. 5 during multiple TDF implementation. The process begins (step 701) when the time ordered queue is checked for the availability of the requested cycle (i.e., the DoD or CoD) (step 703). If the cycle is available, the load instruction is placed in time ordered queue at the requested cycle (DoD or CoD) (step 705). If, however, the cycle is unavailable, the process then checks for the availability of the Alternate Preferred Time (APT) cycle (step 707). If the APT cycle is available, the load instruction is placed in the time ordered queue at that cycle (step 709). If, the APT cycle is unavailable, another check is made for the availability of a cycle within a range of dependencies (RoD) (step 715). If available, the load instruction is placed in the time ordered queue at a cycle time ordered queue within the range of dependency (RoD) (step 717). If, however, no cycle is available within the RoD, the load instruction is placed at an open/cycle within time ordered queue (step 711). Once the load instruction is placed in the time ordered queue, the process ends (step 713). Although not shown, those killed in the art appreciated that many other process steps are possible in attempting to place the load instruction within the time ordered queue. Once all pre-defined steps have been the instruction is placed at a random location which is available.

The process of sending an ACK is extended to the multiple TDF embodiment. A different ACK is sent for each TDF. Each ACK is coded to allow the system resources to decipher which TDF is actually being acknowledged. In this embodiment, the corresponding ACK is sent and the system resources reserve pipeline based on the TDF. The RoD allows the system resources to determine if an available pipeline bubble exists within that range and to allocate that bubble to the load data.

As a final matter, it is important that while an illustrative embodiment of the present invention has been, and will continue to be, described in the context of a fully functional data processing system, those skilled in the art will appreciate that the software aspects of an illustrative embodiment of the present invention are capable of being distributed as a program product in a variety of forms, and that an illustrative embodiment of the present invention applies equally regardless of the particular type of signal bearing media used to actually carry out the distribution. Examples of signal bearing media include recordable type media such as floppy disks, hard disk drives, CD ROMs, and transmission type media such as digital and analogue communication links.

While an illustrative embodiment has been particularly shown and described, it will be understood by those skilled in the art that various changes in form and detail may be made therein without departing from the spirit and scope of the illustrative embodiment.

What is claimed is:

1. A method of delivering data at a preferred time to an execution unit in a data processing system, comprising the steps of:

determining cycles of dependency (CoD) for data subject to successive load instructions the CoD representing a time on a system synchronization timer, at which said data being requested is actually required for processing by said execution unit with consideration of current processing system operational characteristics and data dependencies; and issuing received load instructions to load data into a pipeline of the execution unit at said time corresponding to the CoD, wherein said data arrives at said execution unit when a process executing on said execution unit requires said data.

2. The method of claim 1, further comprising the steps of:

first evaluating a DoD value for said load instruction, said DoD value corresponding to a number of cycles between the dispatching of said load instruction by said processor and a cycle at which said data is desired to be sent from a local data cache of said processor;

subsequently calculating said CoD utilizing said DoD, whereby said CoD is applicable for retrieval of said data from any cache and memory component of said data processing system; and appending said CoD value to said load request prior to issuing said load request from said processor.

3. The method of claim 2, further comprising:

adding a DoD value from a DoD field of N bits to said present time to yield a resulting time of a least significant N bit of said adding step; and generating said CoD by appending said carry over to said resulting time, wherein said carry over signals a user of said CoD to wait until a successive period before placing said load instruction in a time-ordered queue at a cycle slot corresponding to said CoD.

4. The method of claim 3, further comprising:

tracking a simulated ST for said data processing system, wherein said ST has a current time measured in cycles and a period and said ST has alternating even and odd periods; and said generating step includes the steps of:

appending said even/odd bit to said N bits of said resulting time; and storing a value corresponding to said period in said even/odd bit.

5. The method of claim 3, further including the step of, responsive to a determination that a load instruction misses at said local cache, sending said load instruction with said CoD attached to an intervening cache.

6. The method of claim 5, wherein said sending step includes the steps of:

snooping said intervening cache; and when said snooping step results in a hit, loading said requested data from said intervening cache at a time specified by said CoD.

7. The method of claim 1, wherein said issuing step includes the steps of:

snooping a directory of a lower level cache for said data;

when said snooping step results in a hit, checking a time-ordered queue of a cache controller associated with said directory for an available time slot corresponding to said exact time cycle; and placing said load instruction in said available time slot when said time slot is available, wherein said load instruction is issued to said data cache according to its time location in said time ordered queue.

8. The method of claim 7, further comprising the step of sending an acknowledgement (ACK) signal back to a processor from which said load instruction is received, wherein said processor utilizes said ACK signal to reserve a space in said pipeline for delivery of said data at said time corresponding to said CoD.

9. A system of delivering data at a preferred time to an execution unit in a data processing system, said system comprising:

means for determining cycles of dependency (CoD) for data subject to successive load instructions requests, the CoD representing a time on a system synchronization timer, at which said data being requested is actually required for operation by said execution unit with consideration of current processing system operational characteristics and data dependencies; and means for issuing received load instructions to load data into a pipeline of the execution units at said time corresponding to the CoD, wherein said data arrives at said execution unit when a process executing on said execution unit requires said data.

10. The system of claim 9, further comprising:

means for first evaluating a DoD value for said load instruction, said DoD value corresponding to a number of cycles between the dispatching of said load instruction by said processor and a cycle at which said data is desired to be sent from a local data cache of said processor;

means for subsequently calculating said CoD utilizing said DoD, whereby said CoD is applicable for retrieval of said data from any cache and memory component of said data processing system; and means for appending said CoD value to said load request prior to issuing said load request from said processor.

11. The system of claim 10, further comprising:

means for adding a DoD value from a DoD field of N bits to said present time to yield a resulting time of a least significant N bit of said adding step; and means for generating said CoD by appending said carry over to said resulting time, wherein said carry over signals a user of said CoD to wait until a successive period before placing said load instruction in a time-ordered queue at a cycle slot corresponding to said CoD.

12. The system of claim 11, further comprising:

means for tracking a simulated ST for said data processing system, wherein said ST has a current time measured in cycles and a period and said ST has alternating even and odd periods; and said generating means includes:
means for appending said even/odd bit to said N bits of said resulting time; and
means for storing a value corresponding to said period in said even/odd bit.

13. The system of claim 11, further including means, responsive to a determination that a load instruction misses at said local cache, for sending said load instruction with said CoD attached to an intervening cache.

14. The system of claim 13, wherein said sending step includes:
means for snooping said intervening cache; and
means, when said snooping results in a hit, for loading said requested data from said intervening cache at a time specified by said CoD.

15. The system of claim 9, wherein said issuing step includes:
means for snooping a directory of a lower level cache for said data;
means, when said snooping results in a hit, for checking a time-ordered queue of a cache controller associated with said directory for an available time slot corresponding to said exact time cycle; and
means for placing said load instruction in said available time slot when said time slot is available, wherein said load instruction is issued to said lower level cache according to its time location in said time ordered queue.

16. The system of claim 15, further comprising means for sending an acknowledgement (ACK) signal back to a processor from which said load instruction is received, wherein said processor utilizes said ACK signal to reserve a space in said pipeline for delivery of said data at said time corresponding to said CoD.

17. A data processing system for ordering and subsequent issuing of load instructions to enable delivery of load data at a time it is required by its downstream dependency, said system comprising:
a processor;
a data cache;
means for generating a COD value, said CoD value representing a time, measured in cycles on a synchronization timer (ST), when said data is to be required by said downstream dependency during execution of a program;
means for placing said load instruction in a particular location within a time ordered queue of a cache controller, wherein said particular location corresponds to said synchronized timer (ST) time specified by said CoD value, said means being implemented in a cache controller; and
means for issuing said load instruction from said time ordered queue to said data cache at a time which enables said load data to be provided to a pipeline of a system resource at said time.

18. The system of claim 17, wherein said CoD generating means includes:
means for evaluating a distance of dependency value for said load instruction, said DoD value being a relative number of cycles between dispatching said load instruction from a processor and utilization of corresponding data by processes executing on the execution units of said processor with consideration of operational characteristics of said processor and said data's downstream dependency; and
means for converting said DoD field into said CoD field by adding a present synchronization timer (ST) value to said relative number of cycles, wherein said ST has a current system time measured in cycles and a period and said ST has alternating even and odd periods.

19. The data processing system of claim 17, further comprising a plurality of system components interconnected via a bus means, wherein said bus means and said plurality of system components support a load instruction with an appended CoD field.

20. The data processing system of claim 17, further comprising means for acknowledging to said processor that said data requested by said load instruction will be delivered at said time in response to said data being present in said data cache and the availability of a time slot corresponding to said CoD in said time order queue.

21. The data processing system of claim 20, wherein said processor reserves a space in its execution unit pipeline for receiving said data at said time.

* * * * *